(12) United States Patent
Schroeder et al.

(10) Patent No.: US 11,195,012 B1
(45) Date of Patent: Dec. 7, 2021

(54) SYSTEM AND METHOD FOR ASSESSING DAMAGE FROM AERIAL IMAGERY

(71) Applicant: UIPCO, LLC, San Antonio, TX (US)

(72) Inventors: Eric David Schroeder, San Antonio, TX (US); Manfred Amann, San Antonio, TX (US); Jess W. Gingrich, San Antonio, TX (US); Donnette Moncrief Brown, San Antonio, TX (US); Robert Wiseman Simpson, Fair Oaks Ranch, TX (US); Daniel Diaz, San Antonio, TX (US); Abbey Erin May, Boerne, TX (US); Jay Wesley Mullen, San Antonio, TX (US); David Edward Garrison, San Antonio, TX (US); Michael James Leach, San Antonio, TX (US); Karen Marie Shackelford-George, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/887,550

(22) Filed: May 29, 2020

Related U.S. Application Data

(60) Provisional application No. 62/855,114, filed on May 31, 2019.

(51) Int. Cl.
*G06T 7/00* (2017.01)
*G06K 9/00* (2006.01)

(52) U.S. Cl.
CPC .......... *G06K 9/0063* (2013.01); *G06T 7/0002* (2013.01); *G06T 2207/10032* (2013.01)

(58) Field of Classification Search
CPC ................ G06K 9/0063; G06T 7/0002; G06T 2207/10032
See application file for complete search history.

(56) References Cited

U.S. PATENT DOCUMENTS

| | | | |
|---|---|---|---|
| 2017/0352099 A1* | 12/2017 | Howe | G06Q 40/08 |
| 2018/0247416 A1* | 8/2018 | Ruda | G06T 7/0004 |
| 2019/0042829 A1* | 2/2019 | Loveland | G06K 9/00637 |
| 2020/0143481 A1* | 5/2020 | Brown | G06Q 40/08 |
| 2020/0175352 A1* | 6/2020 | Cha | G06N 3/0454 |
| 2020/0364842 A1* | 11/2020 | Chaton | G06N 3/08 |

FOREIGN PATENT DOCUMENTS

WO  WO-2018165753 A1 *  9/2018  ........... G06N 3/0454

\* cited by examiner

*Primary Examiner* — Zhihan Zhou
(74) *Attorney, Agent, or Firm* — Plumsea Law Group, LLC

(57) ABSTRACT

A system and method for capturing and processing aerial images of structures to assess structural damage is disclosed. The system comprises an aerial system associated with an aerial vehicle, which is in contact with a ground system. The aerial system is used to capture images of selected locations associated with known structures and crop those images around the selected locations. The cropped images are then fed into a damage classifier that automatically classifies the degree of damage done to structures at the selected locations. The system and method may be deployed to quickly assess damage of structures in a disaster area.

13 Claims, 5 Drawing Sheets

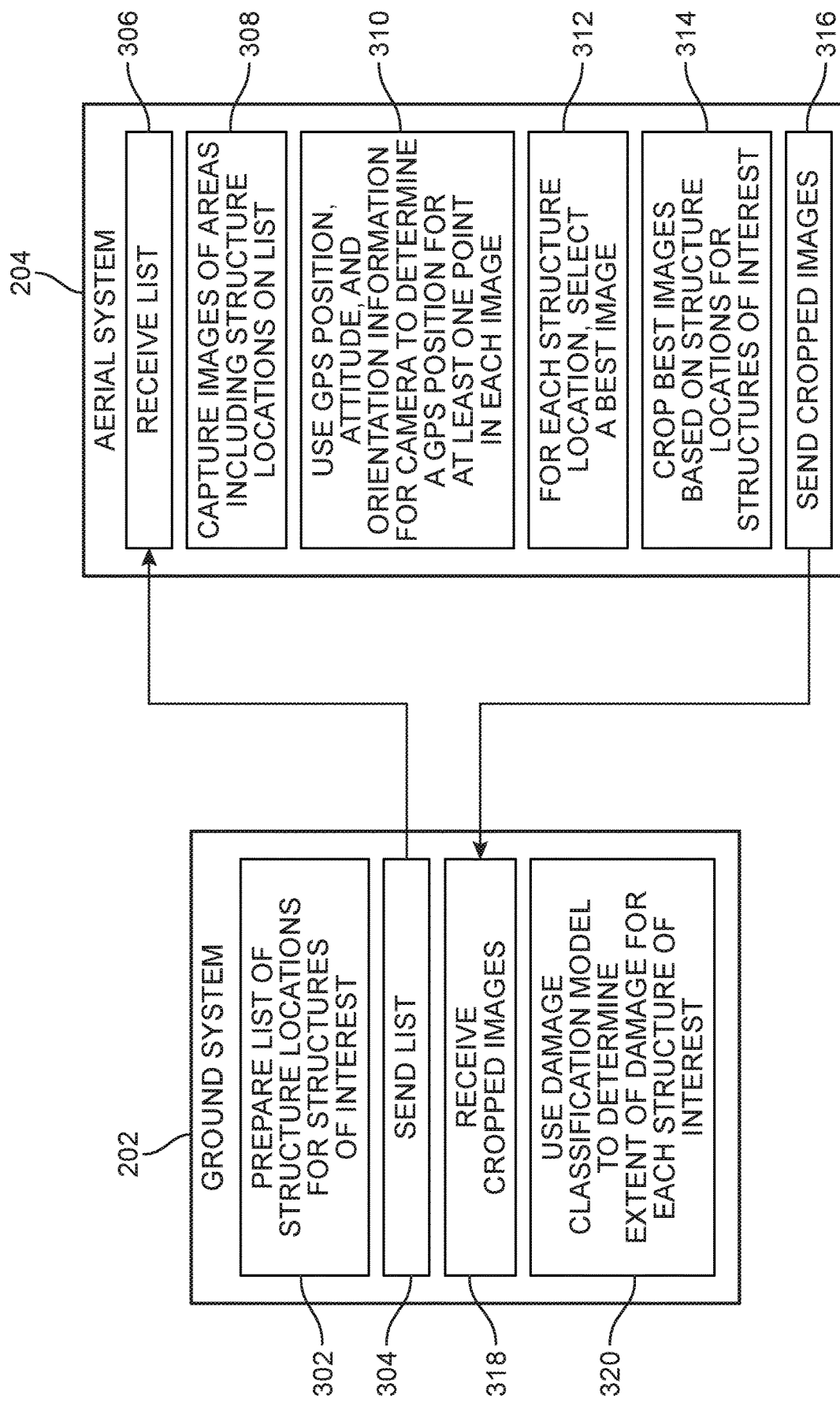

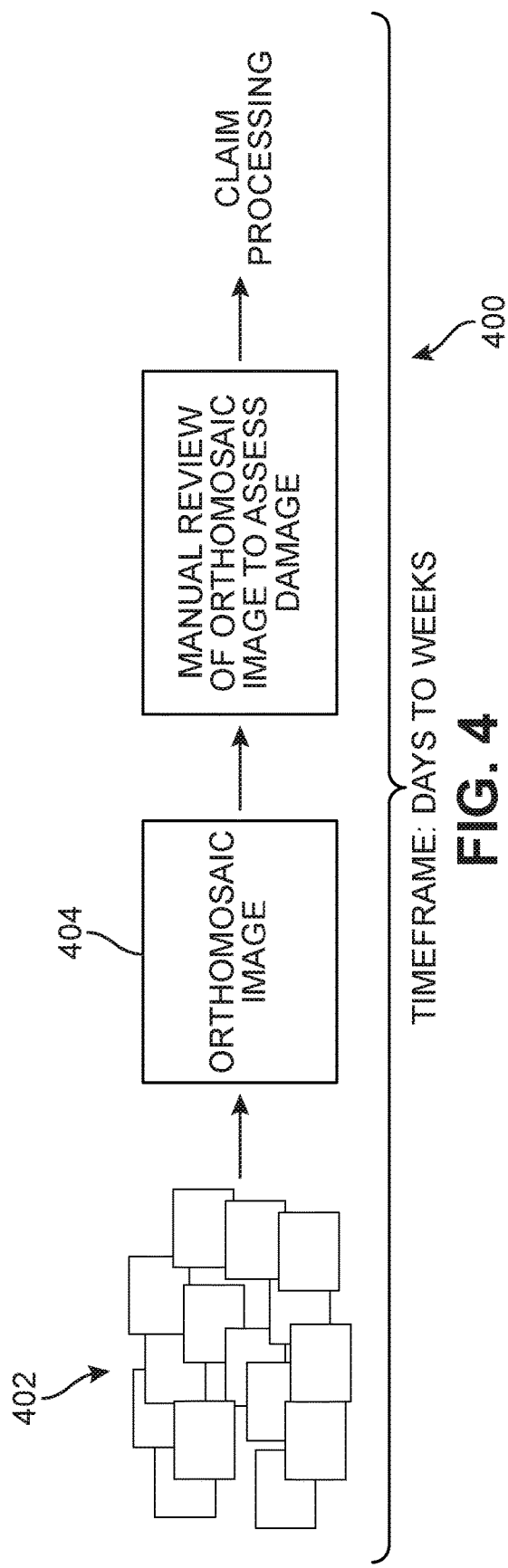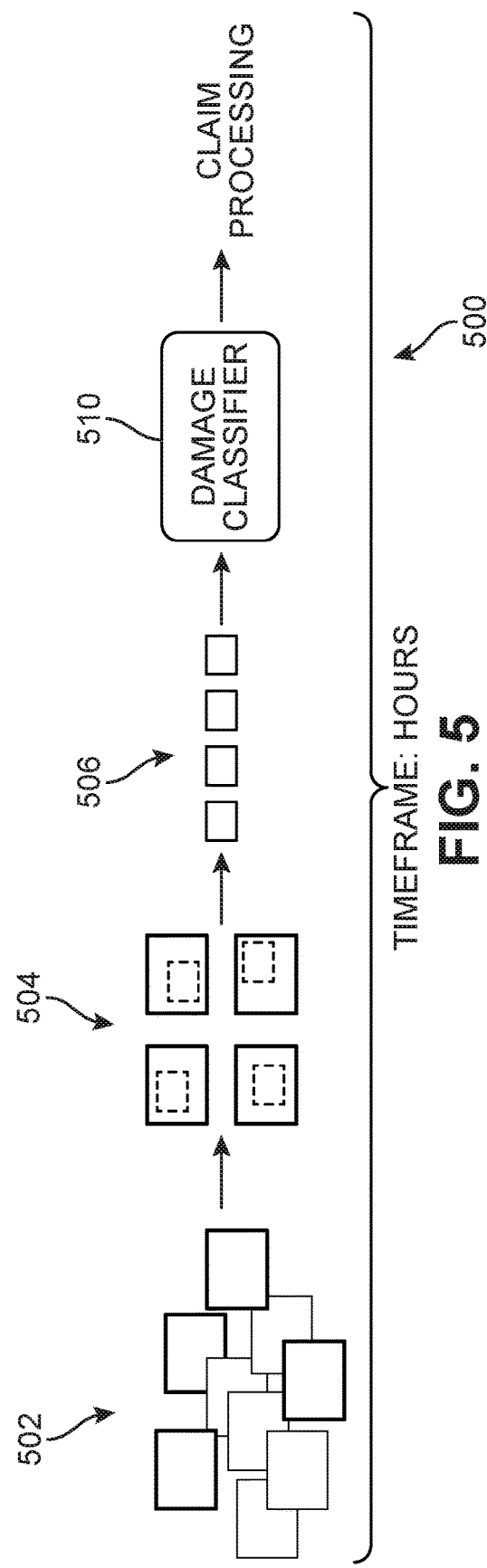

SYSTEM AND METHOD FOR ASSESSING DAMAGE FROM AERIAL IMAGERY

CROSS-REFERENCE TO RELATED APPLICATIONS

This application claims the benefit of Provisional Patent Application No. 62/855,114 filed Mar. 31, 2019, and titled "System and Method for Assessing Damage from Aerial Imagery," which is incorporated by reference herein in its entirety.

TECHNICAL FIELD

The present disclosure generally relates to aerial imagery, and in particular to a system and method for assessing damage done to structures using aerial imagery.

BACKGROUND

Following disasters such as floods, hurricanes, fires, and tornadoes, entities that insure properties in the disaster area may need to survey the area in order to assess any damage that has been done to one or more insured properties. For large scale disaster areas, aerial imagery may be used to assess damage. Specifically, an aerial vehicle may fly over the disaster area collecting continuous images that may later be combined into a single orthomosaic image. Collecting images that cover the entirety of the disaster area is time consuming and resource intensive. In addition, the process of building an orthomosaic image from many aerial images can also be time consuming and resource intensive. The entire process of taking images and generating an orthomosaic image may take days to weeks. This leads to increased delays in assessing insurance claims on the structures in the disaster area, such as homes and businesses.

There is a need in the art for a system and method that addresses the shortcomings discussed above.

SUMMARY

In one aspect, a method of decreasing the time required to assess structural damage using aerial imagery includes steps of creating a list of structure locations corresponding to known structures, and capturing a first image of a first area using a camera, where the first area includes a first structure location for a first known structure. The method also includes steps of cropping the first image to produce a first cropped image including the first known structure, capturing a second image of a second area using the camera, where the second area including a second structure location for a second known structure, cropping the second image to produce a second cropped image including the second known structure, and using a damage classification model to assess damage in the first cropped image and in the second cropped image.

In another aspect, a method of assessing structural damage using aerial imagery in near real-time includes steps of creating a list of structure locations corresponding to known structures, capturing a first image of a first area using a camera, where the first area includes a first structure location for a first known structure, and cropping the first image to produce a first cropped image including the first known structure. At a first time, the method includes using a damage classification model to assess damage in the first cropped image and at a second time that is later than the first time, the method includes capturing a second image of a second area using the camera, where the second area includes a second structure location for a second known structure. The method also includes cropping the second image to produce a second cropped image including the second known structure, and using the damage classification model to assess damage in the second cropped image.

In another aspect, a system for assessing structural damage using aerial imagery includes an aerial system and a ground system in communication with the aerial system. The aerial system is further configured to: capture images for a set of structure locations, generate cropped images associated with the set of structure locations, and send cropped images to the ground system. The ground system is further configured to receive cropped images from the aerial system, and classify the amount of damage to one or more structures using the cropped image information.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 3 is a schematic view of a process for collecting and processing images, according to an embodiment;

FIG. 4 is a schematic view of stages of collecting and processing images, according to another embodiment;

FIG. 5 is a schematic view of stages of collecting and processing images, according to the exemplary process of FIG. 3.

DESCRIPTION OF THE EMBODIMENTS

The embodiments provide a system and method for capturing and processing aerial images of structures in order to assess structural damage. The system comprises an aerial system associated with an aerial vehicle, which is in contact with a ground system. The aerial system is used to capture images of selected locations associated with known structures and crop those images around the selected locations. The cropped images are then fed into a damage classifier that automatically classifies the degree of damage done to structures at the selected locations. The system and method may be deployed to assess damage of structures in a disaster area.

By capturing images only at selected locations rather than across the entire disaster area, the system and method help reduce the amount of resources (in the form of memory) that must be used by the aerial system. Furthermore, by performing some image processing at the aerial system (for example, cropping), processed images of selected structures can be sent directly to a damage classifier, rather than waiting for the images to be assembled into an orthomosaic image. Using the system and method may significantly reduce the amount of time needed to capture and process images of selected structures and may help enable damage assessment for insurance claims in near real time.

Figure 1:
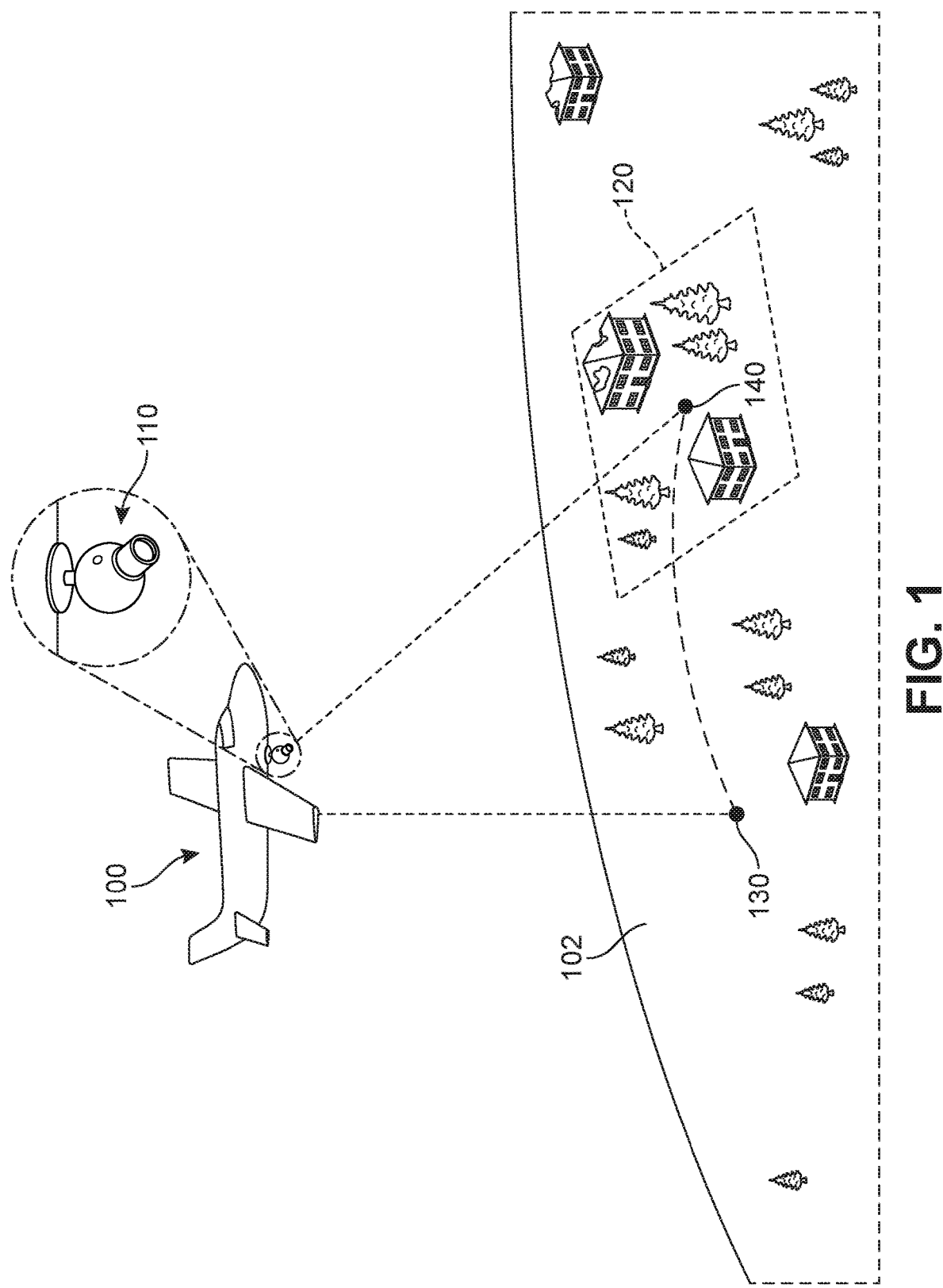
FIG. 1 is a schematic view of a configuration where an aerial vehicle is collecting aerial images of a disaster area, according to an embodiment.

FIG. 1 is a schematic view of an aerial vehicle 100 performing a survey of a region 102 following a disaster. As used herein, the term "aerial vehicle" refers to any kind of plane, helicopter, drone, or other flying vehicles. In this exemplary embodiment, aerial vehicle 100, also referred to simply as vehicle 100, is a plane operated by a pilot. However, in other embodiments, vehicle 100 could be remotely operated.

Vehicle 100 includes at least one camera 110 for capturing images. In the example shown in FIG. 1, camera 110 is used to capture an image of an area 120. Vehicle 100 may also include additional systems to facilitate capturing, processing, and transmitting image information about one or more areas.

Figure 2:
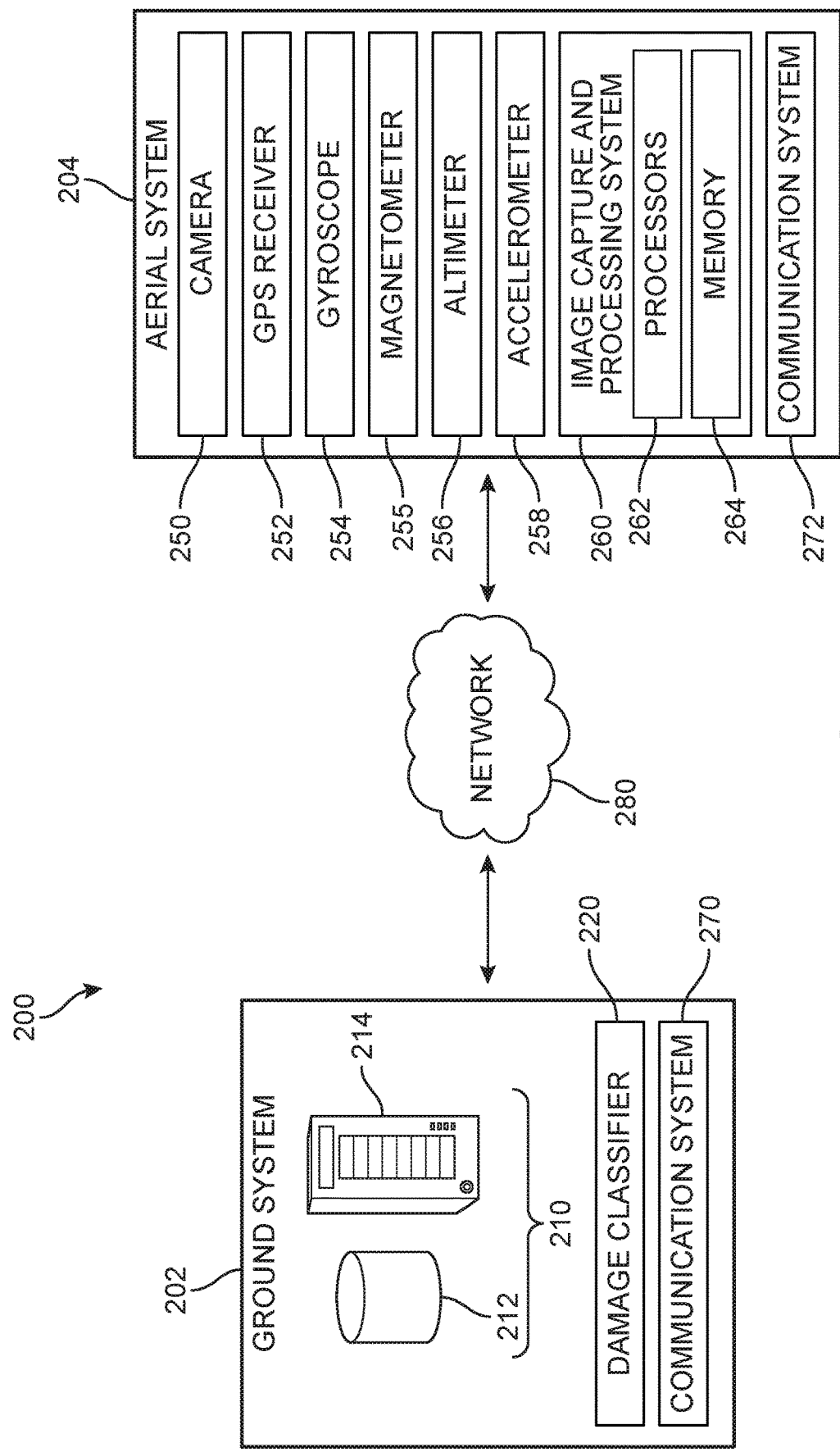
FIG. 2 is a schematic view of a damage assessment system, according to an embodiment.

FIG. 2 depicts a schematic view of an exemplary damage assessment system 200, which may be used to capture images of structures to assess damage, for example, after a disaster such as a hurricane, fire, tornado or flood. System 200 is further comprised of a ground system 202 and an aerial system 204. Ground system 202 includes provisions for gathering information about potentially damaged structures following a disaster that can be used to facilitate an image survey of the disaster area. Ground system 202 may also include provisions for processing image data and for communicating with various other systems. Aerial system 204 includes provisions for capturing aerial images of one or more areas. Aerial system 204 may also include provisions to determine precise locations for captured images, as well as for performing image processing.

As seen in FIG. 2, ground system 202 comprises a computing system 210. Computing system 210 can include, for example, a computer 212 and a database 214. Computer 212 may further include one or more processors and memory. Computer 212 could be any kind of computer such as a desktop computer, a laptop computer, a server, or any other kind of computer with sufficient computing resources for performing tasks such as image classification.

Ground system 202 may also include a damage classifier 220. Damage classifier 220 may be any program or algorithm that is used to classify images according to the degree of damage the structure has sustained. In some embodiments, damage classifier 220 includes one or more machine learning models. In one embodiment, damage classifier 220 could include a convolutional neural network. In other embodiments, damage classifier 220 could comprise any other algorithm (or set of algorithms) from the field for machine learning and/or machine vision.

Aerial system 204 may comprise various systems and components that are disposed within an aerial vehicle (such as aerial vehicle 100). Aerial system 204 may include a camera 250 for capturing images. Camera 250 may comprise any kind of camera, including any kind of digital camera. Aerial system 204 can also include a GPS receiver 252 for receiving GPS information that can be used to determine a GPS location for the aerial vehicle.

Aerial system 204 may also include sensors for measuring various kinds of information related to altitude and orientation. For example, aerial system 204 can include a gyroscope 254, a magnetometers 255, an altimeter 256, and an accelerometer 258. In some embodiments, aerial system 204 can include an attitude and heading reference system (AHRS), which may comprise one or more gyroscopes, magnetometers and/or accelerometers and can be used to determine pitch, roll, and yaw information. Using these devices, the orientation, heading, and height of the aerial vehicle (and of camera 250) can be determined. This information, when used with a GPS location for the aerial vehicle, can be used to infer the location of one or more points in an image taken from the aerial vehicle as described in further detail below.

Aerial system 204 can also include an image capture and processing system 260, also referred to simply as processing system 260. Processing system 260 may be used to store, process, and transmit image information. Additionally, in some cases, processing system 260 can receive GPS or other coordinate information about one or more target locations. To facilitate these tasks, image capture and processing system 260 may include one or more processors 262 as well as memory 264. Memory 264 can store instructions for programs that facilitate storing, processing, and transmitting image information.

Both ground system 202 and aerial system 204 can include communication systems. For example, ground system 202 can include communication system 270 and aerial system 204 can include communication system 272. These communication systems enable information to be transmitted between ground system 202 and aerial system 204 via a network 280. Thus, the type of communication components used in each communication system can be selected according to the type of network used. In some cases, a cellular network could be used so that each communication system includes a cellular radio or other component that enables cellular communication. Using a cellular network may enable information to be exchanged while aerial system 204 is in the air where Wi-Fi or other networks might be unavailable. In other cases, network 280 could comprise any kind of local area network and/or wide area network. In some cases, network 280 may be a Wi-Fi network. Alternatively, ground system 202 and aerial system 204 could be connected by wires, for example, when aerial system 204 is on the ground and near ground system 202.

One or more components of aerial system 204 could be disposed within a single computing device. Examples of computing devices that could be used include, but are not limited to: laptop computers, tablet computers, smartphones or other computing devices.

FIG. 3 is a schematic view of a process for capturing and processing images of structures following a disaster to improve the speed of assessing structural damage and facilitating claim processing. As seen in FIG. 3, some of the steps may be performed by ground system 202 and some of the steps may be performed by aerial system 204.

This process may begin, for example, after a disaster has occurred. An insurance provider that needs to assess damages to structures (for example, houses and other buildings) in the disaster area may need to have aerial imagery taken to survey multiple structures simultaneously.

Starting in step 302, upon learning that a disaster has occurred, an insurance company (or other party) may prepare a list of structures in the disaster area that are insured and thus require damage assessments to be performed. Each structure may be further associated with location information. As used herein, the term "location information" refers to any kind of information that can be find a geographic location for an object. Location information may include latitude and longitude information. Location information could also comprise a street address. It may be appreciated that location information provided in one format (for example, a street address for a structure) could be converted into another format (for example, a latitude and longitude position). When the location information is specific to a structure (such as a house, office building, or any other structure) the term "structure location" may be used.

In step 304, the list of structure locations is sent to aerial system 204 and received in step 306. Using this list of structure locations, aerial system 204 captures images of areas that include the structure locations in step 308. For example, an airplane may fly over the disaster area and photograph areas according to the provided list of structure locations.

Next, in step 310, aerial system 204 uses GPS position information for the aerial vehicle (and camera), along with orientation and altitude information to determine a GPS position for at least one point in the captured image. In some cases, an aerial system can use an attitude and heading reference system to determine pitch, yaw, and/or roll information. For example, as seen in FIG. 1, a GPS location 130 of aerial vehicle 100 in terms of longitude and latitude can be determined using GPS signals received at GPS receiver 252 (see FIG. 2). However, as shown, the area 120 captured by camera 110 is located away from GPS location 130. The GPS location of a central location 140 within area 120 can be determined, however, if sufficient information is known about the orientation and height of the aerial vehicle (and camera) at the moment that the image is taken. Specifically, information gathered from sensors, such as gyroscope 254, altimeter 256 and accelerometer 258 may be used, along with GPS location 130, to deduce the GPS coordinates of central location 140 (as well as any other locations within area 120).

In step 312, a best image may be selected for each structure location. This step may be needed when multiple images are taken with overlapping coverage of one or more structures. In some cases, for example, image capture and processing system 260 may analyze all the images taken and determine a best image to use for one or more structures on the list. For example, in one embodiment, processing system 260 may select an image that includes several of the structures on the list and may discard other images that each contain only a single structure of the several structures, to minimize the number of images that must be saved and/or processed at a later time. In another example, processing system 260 may select an image that has a structure of interest disposed closer to the center of the image and discard images where the structure of interest is close to the periphery of the image, thereby ensuring the entirety of the structure is contained within the image.

In step 314, the best images are cropped. Specifically, for each structure location, the system may crop the best image associated with that structure to obtain an image of reduced size that includes the structure of interest. In one embodiment, the original images could be cropped to 200×200 pixel images or 400×400 pixel images that are centered approximately around the structure location of interest. In other cases, the output of the cropping process could be images of any size suitable for processing by a damage classification model. By cropping the initially captured image to a 200×200 or 400×400 pixel size, the resulting image files may have sizes on the order of tens of kilobytes, rather than tens of megabytes. This allows for a smaller memory capacity in the aerial system, and/or for additional memory capacity to be used for other purposes, such as image processing. Additionally, the smaller image file sizes may help improve latency in transferring images to a ground system, especially when using cellular networks.

In step 316, cropped images are sent by aerial system 204 to ground system 202. In some embodiments, the images may be sent while an aerial vehicle is still flying to ensure images can be analyzed to assess structure damage as quickly as possible to prevent delays in claims processing.

After the cropped images are received by ground system 202 in step 318, the images may be fed into a damage classification model in step 320. The damage classification model classifies each structure according to various levels of damage. As an example, the damage classification model could assess structures as having "no damage," "minor damage," "significant damage," or "total loss." Of course, other classifications are possible. In addition to classifying the structures according to levels of damage, a damage classifier could also classify the amount of damage using other metrics such as the cost of damage, the cost of payout, as well as other possible metrics.

FIG. 4 is a schematic view of the imagery workflow required to assess damage following a disaster using an alternative process 400 to the one described above and depicted in FIGS. 1-3. In process 400, a large number of initial images 402 are gathered as an aerial vehicle sweeps across the disaster area from overhead. Here, the process requires that enough images are collected to cover the entire area, as they will be assembled in a later step. Next, each image is analyzed and assembled together into a single orthomosaic image 404 (or orthomosaic map) that can be used to find structures at a given location. Producing this orothoimage from the individual images is a resource intensive process and can take days or even weeks to assemble. Once the orthomosaic image 404 has been produced, it may be manually reviewed to find structures that have been damaged. Information about damaged structures can then be used in claim processing.

As indicated in FIG. 4, this process may take days to weeks to complete. For insured parties waiting for insurance claims on damaged properties to be processed, waiting weeks, or even days, may be economically unfeasible. Furthermore, the insuring party may incur increasing costs the longer the claims processing takes, since it is typically cheaper to repair damaged structures immediately rather than waiting for additional problems to develop.

FIG. 5 is a schematic view of the imagery workflow required to assess damage following a disaster using the process described above and shown in FIGS. 1-3. In process 500, images 502 may be collected. Because this process does not require the assembly of an orthomosaic image, the aerial vehicle only needs to capture images for the listed structure locations, rather than collecting enough images to cover the entire disaster area. This may result in substantially less images being taken, which can reduce the amount of data that needs to be initially stored and also reduce the overall time required to collect images. Since collecting fewer images reduces flight time, this can also provide additional savings in terms of fuel for the aerial vehicle (and thus, can reduce the overall cost of collecting images). As described above, once the images have been collected, a subset corresponding to the best images 504 can be selected for further processing. After determining a GPS location for one or more points within each of the best images 504, the desired structure locations within each image can be identified and cropped, according to the process described above. The resulting cropped images 506 may then serve as inputs to damage classifier 510. The output from damage classifier 510 (for example, a "total loss" assessment for a structure that is irreparably damaged) can be used for processing claims on the associated structure.

Because a significant amount of pre-processing is performed by a system onboard the aerial vehicle, the overall timeframe for completing this exemplary workflow may take hours, as opposed to days or weeks. This enables near real-time claims processing where an insuring party can have a claim opened and processed hours after a disaster has occurred and long before the insured party would even have a chance to submit a claim. This facilitates quick payments to insured parties. By paying insured parties more quickly, the system and method facilitate improved customer satisfaction while also reducing costs that might incur if the structural damage gets worse while the claim process is ongoing.

Figure 6:
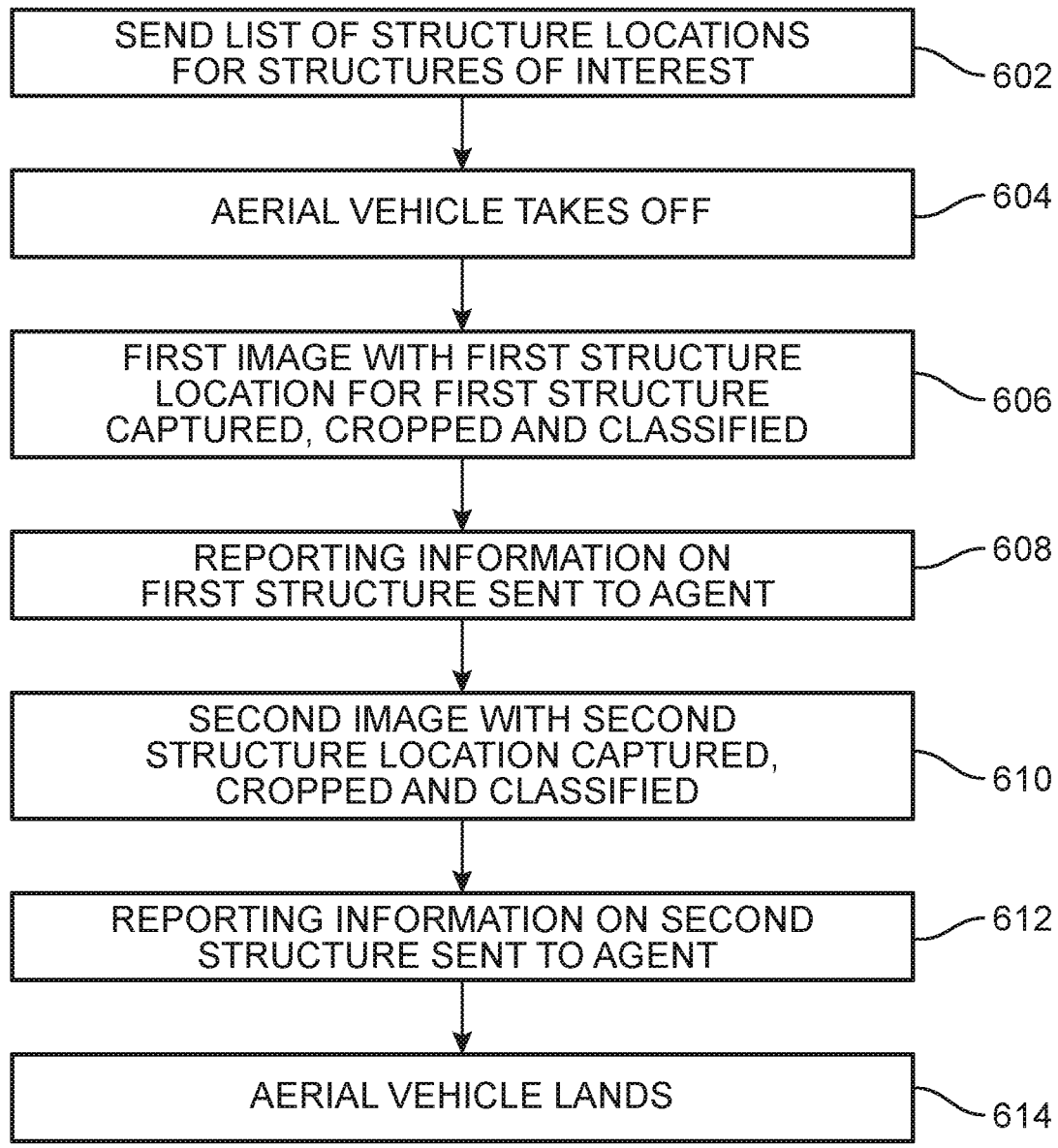
FIG. 6 is a schematic view of a process for collecting and processing images in near real time, according to an embodiment.

FIG. 6 is a schematic view of a process for sending information about one or more structures to a ground system while an aerial vehicle is still in flight. This exemplary process shows how structural damage may be assessed in near real-time so that one structure can be assessed before images for other structures have even been captured. It may be noted that this near real-time assessment may not be possible in alternative processes that require an orthomosaic image to be generated before structural damage can be assessed.

In a first step 602, a ground system may be used to gather and then send structure locations for structures of interest to an aerial system. Next, in step 604 an aerial vehicle takes off. In step 606, a first image including a first structure location for a first structure is captured, cropped and classified. In some cases, the cropped image can be sent to a ground system (such as ground system 202) for classification while the aerial vehicle is in flight. However, in other cases, classification could be performed by an aerial system (such as aerial system 204 in FIG. 2).

In step 608, reporting information about the first structure is sent to an agent for claims processing. This information may comprise a report including before and after images (where a before image is available), a damage classification as provided by a damage classifier, as well as possibly other information.

In step 610, a second image including a second structure location for a second structure is captured, cropped, and classified. In step 612, reporting information on the second structure is send to an agent for claims processing.

Finally, in step 614, the aerial vehicle lands. This exemplary process shows how image information about one or more structures can be captured and processed in near real-time, before an aerial vehicle is finished its flight. The allows claim assessors to process claims very soon after a disaster event has concluded.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of assessing structural damage using aerial imagery in near real-time, the method comprising:
   retrieving a list of known structures and GPS positions for the known structures;
   capturing, at a first time, a first image of a first geographic area including a first known structure using a camera aboard an aerial vehicle;
   sensing a first GPS position, a first attitude, and a first orientation for the aerial vehicle at the first time when the first image is taken;
   determining a second GPS position for a first reference location within the first image using the first GPS position, the first attitude, and the first orientation;
   retrieving a third GPS position for the first known structure;
   identifying a first structure location of the first known structure within the first image using the second GPS position and the third GPS position;
   automatically cropping, using the first structure location, the first image to produce a first cropped image including the first known structure;
   at a second time, using a damage classification model to assess damage in the first cropped image;
   at a third time that is later than the second time, capturing a second image of a second geographic area including a second known structure using the camera
   sensing a fourth GPS position, a second attitude, and a second orientation for the aerial vehicle at the third time when the second image is taken;
   determining a fifth GPS position for a second reference location within the second image using the fourth GPS position, the second attitude, and the second orientation;
   retrieving a sixth GPS position for the second known structure;
   identifying a second structure location of the second known structure within the second image using the fifth GPS position and the sixth GPS position;
   automatically cropping, using the second structure location, the second image to produce a second cropped image including the second known structure; and
   at a fourth time that is later than the third time, using the damage classification model to assess damage in the second cropped image.

2. The method according to claim 1, wherein the aerial vehicle is an airplane.

3. The method according to claim 1, wherein the first known structure is a first building and wherein the second known structure is a second building.

4. The method according to claim 1, wherein the aerial vehicle is a drone.

5. The method according to claim 1, wherein the damage classification model outputs categories of damage.

6. The method according to claim 5, wherein the categories of damage include at least a category indicating no damage and a category indicating a total loss.

7. A system for assessing structural damage using aerial imagery, comprising:
   a device processor;
   a non-transitory computer readable medium storing instructions that are executable by the device processor to:
      retrieve a list of known structures and GPS positions for the known structures;
      capture, at a first time, a first image of a first geographic area including a first known structure using a camera aboard an aerial vehicle;
      sense a first GPS position, a first attitude, and a first orientation for the aerial vehicle at the first time when the first image is taken;
      determine a second GPS position for a first reference location within the first image using the first GPS position, the first attitude, and the first orientation;
      retrieve a third GPS position for the first known structure;
      identify a first structure location of the first known structure within the first image using the second GPS position and the third GPS position;
      automatically crop, using the first structure location, the first image to produce a first cropped image including the first known structure;
      at a second time, use a damage classification model to assess damage in the first cropped image;
      at a third time that is later than the second time, capture a second image of a second geographic area including a second known structure using the camera;
      sense a fourth GPS position, a second attitude, and a second orientation for the aerial vehicle at the third time when the second image is taken;
      determine a fifth GPS position for a second reference location within the second image using the fourth GPS position, the second attitude, and the second orientation;
      retrieve a sixth GPS position for the second known structure;
      identify a second structure location of the second known structure within the second image using the fifth GPS position and the sixth GPS position;
      automatically crop, using the second structure location, the second image to produce a second cropped image including the second known structure; and
      at a fourth time that is later than the third time, use the damage classification model to assess damage in the second cropped image.

8. The system according to claim 7, wherein the first known structure is a first building and wherein the second known structure is a second building.

9. The system according to claim 8, wherein the aerial vehicle is an airplane.

10. The system according to claim 8, wherein the aerial vehicle is a drone.

11. The system according to claim 7, wherein the system is a ground based system in communication with the aerial vehicle.

12. The system according to claim 7, wherein the damage classification model comprises a machine learning model for classifying the amount of damage to the at least one known structure.

13. The system according to claim 12, wherein the machine learning model is a neural network.

\* \* \* \* \*